United States Patent [19]
Ocker

[11] Patent Number: 5,404,746
[45] Date of Patent: Apr. 11, 1995

[54] POST DEPRESSURIZATION INDICATOR

[75] Inventor: Klaus Ocker, Fraser, Mich.

[73] Assignee: AlliedSignal Inc., Morristown, N.J.

[21] Appl. No.: 220,755

[22] Filed: Mar. 31, 1994

[51] Int. Cl.⁶ .......................... G01M 3/02; G08B 1/04
[52] U.S. Cl. ........................................ 73/37; 73/49.3;
116/266; 222/23
[58] Field of Search ................. 73/37, 862.53, 744,
73/865.9, 49.3; 116/212, 266–268, 272, 281;
222/23

[56] References Cited
U.S. PATENT DOCUMENTS

| | | | |
|---|---|---|---|
| 3,448,620 | 6/1969 | Ryan | 116/266 |
| 3,595,200 | 7/1971 | Cilent | 116/268 |
| 3,952,691 | 4/1976 | Peltz et al. | 116/272 |

Primary Examiner—Hezron E. Williams
Assistant Examiner—Michael J. Brock
Attorney, Agent, or Firm—Markell Seitzman

[57] ABSTRACT

A post depressurization device (30) for providing an indication of the pressure that existed within a fluid filled pressure vessel (22) just prior to depressurization of the pressure vessel, having a housing (102) and a piston (130) for temporality sealing an open end of the housing and outwardly movable in response to a pressure differential not less then a predetermined level generated subsequent to the depressurization of the pressure vessel. The piston and the housing cooperating to define a pressure storage cavity (156). The housing including a valve (122) for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel.

6 Claims, 2 Drawing Sheets 5,404,746

POST DEPRESSURIZATION INDICATOR

BACKGROUND AND SUMMARY OF THE INVENTION

The present invention relates to a device that provides an indication of the pressure that existed within a pressure vessel just prior to its being opened or depressurized. More particularly, the present invention is useful in occupant safety restraint systems employing pressure vessels such as those used in a hybrid inflator.

Hybrid inflators typically include a pressure vessel having a quantity of stored gas under pressure. If the stored gas leaked out of the pressure vessel there may not be a sufficient quantity of gas therein to adequately inflate an air bag. Some hybrid inflators include a low pressure switch or sensor to generate a warning signal to the driver, in the event that its internal pressure dropped as a result of losing some quantity of gas. Pressure switches include wires which extend through openings in the pressure vessel. These openings are appropriately sealed using a glass to metal seal of known variety. As can be appreciated these wires, opening and seal may create a potential leak path if they are not correctly sealed. The pressure switch signal, via electronic circuitry provides an indication to the vehicle occupant that the inflator may not be in an operative condition and that repair or replacement may be needed. History and experience have shown that the use of a low pressure switch is unnecessary. If the pressure switch or sensor is eliminated it might still be desirable to provide an indication that the pressure vessel, i.e. the hybrid inflator, was properly pressurized prior to an accident, that is, it contained a sufficient amount of pressurized gas to inflate an air bag.

It is the object of the present invention to provide a device for use within a hybrid inflator that will provide a post depressurization, or "tell tale", indication of inflator function. An additional object of the present invention, is to provide an hybrid inflator having a higher degree of reliability against leakage than one that includes a pressure switch.

Accordingly, the invention comprises: a post depressurization device for providing an indication of the pressure that existed within a fluid filled pressure vessel just prior to depressurization of the pressure vessel, comprising: a housing and piston means for temporarily sealing an open end of the housing and outwardly movable in response to a pressure differential, not less then a predetermined level, that is generated subsequent to the depressurization of the pressure vessel. The piston means and the housing cooperate to define a pressure storage cavity bounded by the piston and housing. The housing including valve means, such as an orifice or check valve for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel. A frangible member may be used to connect the piston to the housing. This member breaks in response to an applied force of predetermined magnitude to permit the piston to move outwardly in response to the pressure differential.

Many other objects and purposes of the invention will be clear from the following detailed description of the drawings.

DETAILED DESCRIPTION OF THE DRAWINGS

Figure 1:
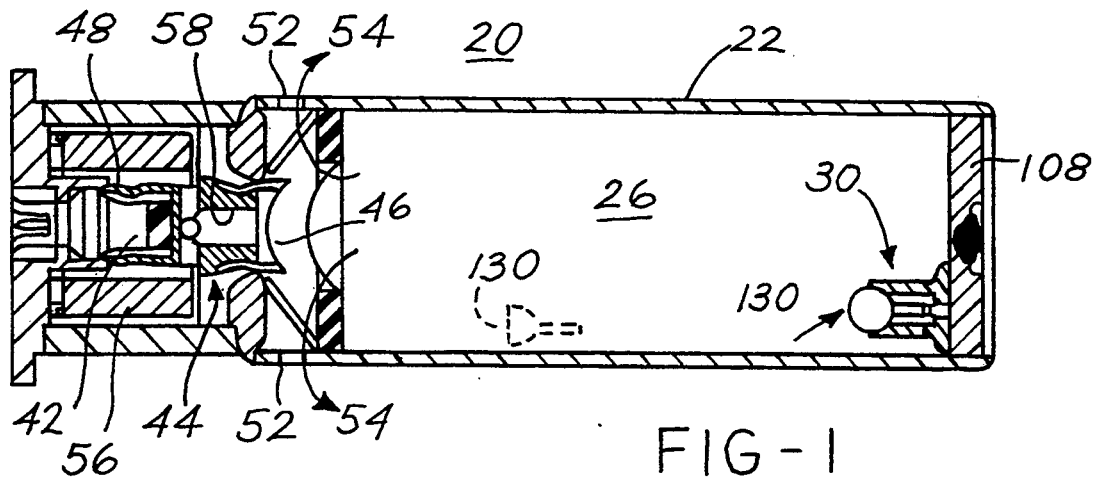
FIGS. 1 and 2 illustrates the major components of the present invention.

Reference is made to FIG. 1 which illustrates a hybrid inflator 20 comprising a pressure vessel 22, an activation portion 24 and a post inflation indicating device generally shown as 30. While the preferred embodiment of the invention shows the device 30 within the inflator, it should be appreciated that it could be mounted external thereto. U.S. Pat. No. 5,076,607 is illustrative of hybrid inflators and is incorporated herein by reference. The activation portion comprises a pyrotechnic squib 42. Positioned about the squib 42 is a movable piston 44 having a cutting surface 46 at one end. The other end 48 of the piston 44 is frictionally engaged to the squib 42. As is known in the art upon receipt of a control signal, the squib begins to burn. The products of combustion urge the piston 44 outwardly (to the right, as shown in FIG. 1) to break a frangible disk 50 which encloses an end of the pressure vessel 22. The pressurized gas 26 (typically Argon) stored within the pressure vessel 22 thereafter flows across the broken disk and out through the exit orifice(s) or ports 52. The gas flow is generally shown by arrows 54. As the squib burns it ignites a closely positioned quantity of propellent 56, such as Arcite. The products of combustion of the burning propellent are communicated through various passages 58 in the piston 44 to heat the remaining inflation gas 26 prior to its exiting (through orifices or ports 52) to fill a closely positioned air bag.

Figure 2:
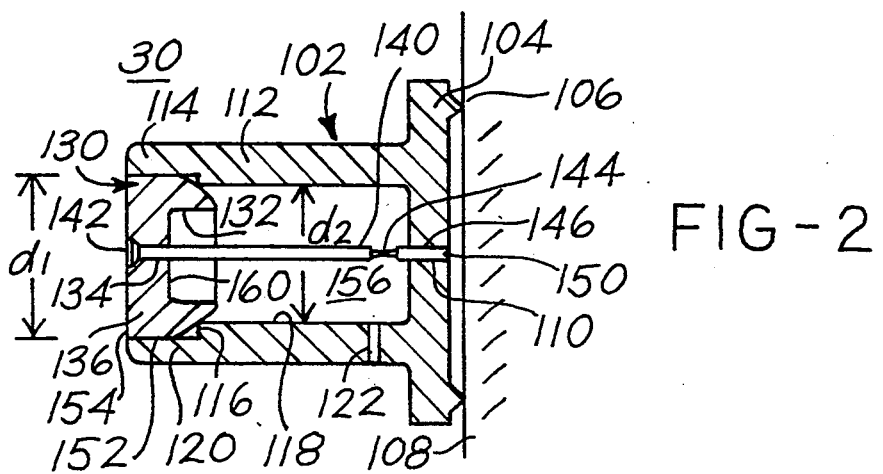

Reference is made to FIG. 2 which shows an enlarged cross-sectional view of the device 30. The device 30 includes a cup shaped housing 102 having at one end 104 a triangular annular boss 106 to facilitate welding. As can be seen from FIGS. 1 and 2, the boss 106 may be welded to the end cap 108 of the pressure vessel. The end 104 of the housing includes a first passage 110 and the housing 102 further includes a cylindrical wall 112. The end 114 of the cylindrical wall includes an annular shoulder 116 defining the transition between a small diameter portion 118 and a larger diameter portion 120 thereof. The wall 112 includes a valve such as a bleed orifice 122, the purpose of which will be clear from the description below. Fitted upon the end 114 of the cylindrical wall is a movable piston 130. The piston 130 includes a hollowed out section 132 to reduce its weight and a central passage 134 formed therethrough.

Extending through passage 134 is a frangible member 140 such as a bar or wire. One end 142 of the member 140 is enlarge to fit within a correspondingly wide portion of passage 134. One part of the member 140 includes a stress enhancing region 144 such as a reduced diameter portion. The other end 146 of member 140 is fixedly secured to the end 104 of housing 102. As illustrated the end 146 of member 140 is welded at 150 to the housing. The weld 150 also seals end 146 to the housing to prevent gas leakage through passage 110. The end 142 of member 140 may similarly be fixedly attached to the piston by welding, or by an epoxy or other method to prevent gas leakage through passage 134.

In operation, the piston 130 with the member 140 extending therefrom is fitted within the housing 112 such that end 146 of member 140 extends through passage 110. The shoulder 116 engages a portion of the piston 130 and functions as a motion stop. The piston 130 cooperates with the wall 112 to provide a gas seal therebetween, such seal is shown as 152. In this regard the piston may be made from metal, or a synthetic plastic or composite material.

In normal operation the pressure vessel 22 of the inflator 20 is filled with pressurized inflation gas, typically 98% Argon and 2% Helium to a pressure of about 2500 psi (172 Bar). While not a part of the present invention the Helium is sensed by a leak detector to check the initial sufficiency of any welds in the pressure vessel. The pressurized inflation gas, in the pressure vessel 22, envelopes the device 30 and presses upon the exposed side 154 of the piston 130. When the pressure vessel 22 is initially filled there is no inflation gas within the pressure cavity 156 of the device 30, as fluid (gas) flow is inhibited by the small orifice 122. During this time a pressure force F acts on the exposed side 154 of the piston equal to:

$$F = P \times Area = (P \times dl^2 \times \pi)/4,$$

where P is the internal pressure within the pressure vessel and dl is the diameter across the wider part of the cylindrical wall 112. As there is no or very little inflation gas in the cavity 156 at this time the pressure force acting on the opposite side 160 of the piston is near zero and increases as gas fills the cavity 156.

Over time, pressurized inflation gas enters or leaves the cavity 156 through orifice 122, and acts upon side 132 of the piston. The pressure in the cavity 122 equalizes at the internal pressure level of the pressure vessel 122.

When the inflator is activated the pressure vessel is depressurized via the release the pressurized gas, when the frangible disk 50 is opened. An air bag, mounted nearby, is rapidly inflated, typically within about 40–60 milliseconds. As the pressurized inflation gas leaves the pressure vessel, the internal pressure P rapidly approaches zero. Fluid flow into and out of the device 30, i.e. cavity 156, is inhibited by the orifice 122. As such, even though the pressure in the pressure vessel rapidly reduces, the pressure Pc, within the cavity 156 of the device 30 cannot change rapidly. As such, the pressure within the device remains substantially at the value of the pressure, inside the pressure vessel just prior to depressurization. After depressurization a significant outwardly pushing pressure differential acts on side 160 of the piston causing the frangible member 140 to break at its stressed enhancing portion 144 if the pressure differential is above a determinable value.

Figure 4:
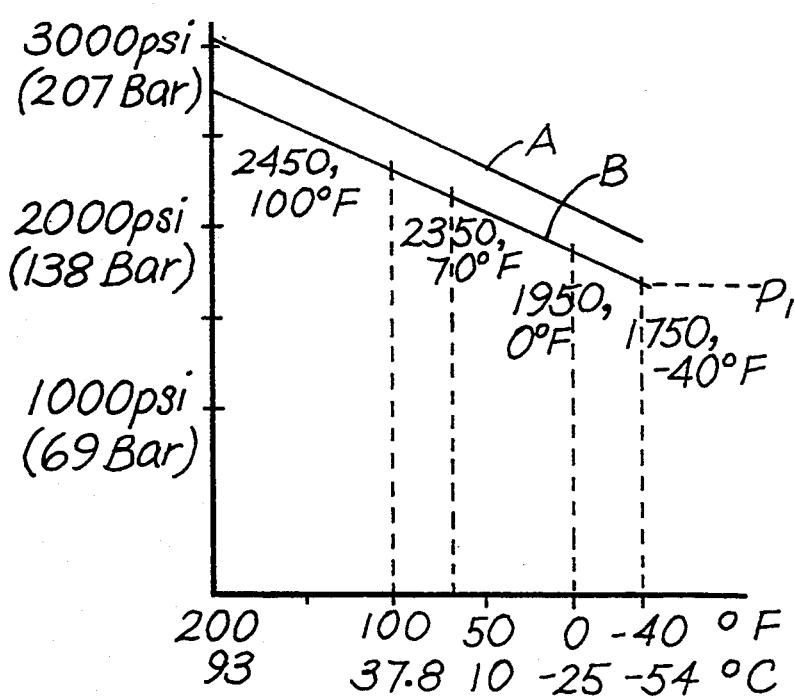
FIG. 4 shows pressure-temperature curves

Reference is briefly made to FIG. 4 which shows a family of curves. Each curve shows the approximate relationship between the pressure within a pressure vessel and temperature for an inflator having a given mass or weight of inflation gas. As an example, curve A shows the pressure-temperature relationship for an inflator that has not lost any inflation gas. Curve B shows the pressure-temperature relationship for an inflator that has lost a determinable amount of gas by weight or mass. An inflator that has lost some of its inflation capability because of a diminished amount of stored gas will not cause an air bag to inflate as fully as an air bag that is completely full. However, it should be appreciated that even though a significant amount of gas is lost, the air bag is still able to adequately protect an occupant, since the desired speed of inflation and fullness of inflation of the air bag will depend amongst other things on the severity of a crash, the energy absorbing ability of the vehicle, the degree to which the occupant is retained by a seat belt, and the position of the occupant relative to the air bag. Superimposed upon these curves is a pressure level P1. This pressure level is indicative of a low level limit value of inflation pressure at a given temperature (1750 psi, −40° F. or 121 Bar, −30° C.) consequently, if the inflator is designed to property operate if the internal pressure is above this level, the device 30 must be able to provide some post depressurization or activation indication of the internal pressure. Implicitly this pressure level P1 also indicates the minimum pressure differential force (Pc × Area) that would be exerted on the piston 130 just after depressurization under these pressure/temperature conditions. It should be recalled that the pressure or force acting on side 154 of piston 130 rapidly falls to essentially zero and the force acting on side 160 is equal to Pc times area.

With the pressure vessel 22 depressurized, a force will be exerted on the piston 130 tending to push the piston 130 out of and away from the housing 102. This force will also exerted on the frangible member 140. If the tensile strength of the stress enhancing region 144 of the member 140 is chosen to be at a level equal to the applied force (at pressure level P1), the frangible member 140 will break, thereby permitting the piston 140 to move outwardly relative to the housing.

Figure 3:
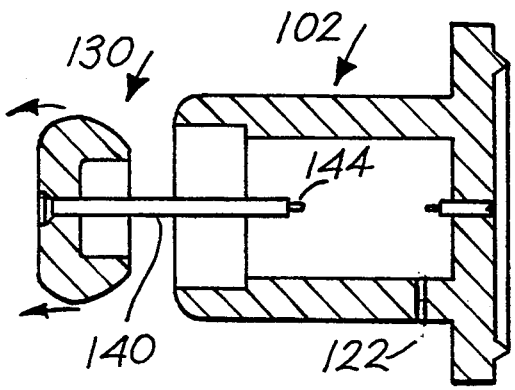
FIG. 3 illustrates the configuration of an indicator after the depressurization of a pressure vessel.

Reference is briefly made to FIG. 3 which illustrates the frangible member 140 after it is broken with the piston 130 moved outwardly from the housing 102.

If for some reason the pressure vessel lost a very significant amount of inflation gas its internal pressure as well as the pressure in cavity 156 would be less than P1. Subsequent to depressurization, a pressure/force will be exerted on piston 130, as described above, tending to move the piston outwardly. However, since the force is below the tensile strength of the member 140, the piston will remain retained within the housing 102.

At some time subsequent to depressurization of the pressure vessel it might be necessary to inspect the hybrid inflator. As mentioned above, if the pressure within the pressure vessel was at or above its minimum design pressure level P1, the frangible member 140 will break and the piston 130 is no longer permanently fixed to its housing 102. Such inspection may me as simple as grasping the inflator and shaking it. If upon shaking, a clanging noise is heard, such noise is indicative of the fact that the pressure vessel contained a sufficient quantity of pressurized gas, just prior to its depressurization, as the noise can only be produced by a loose and dislodged piston 130, which can only be dislodged if the internal pressure within the pressure vessel, just prior to its depressurization was above the pressure level P1.

Figure 5:
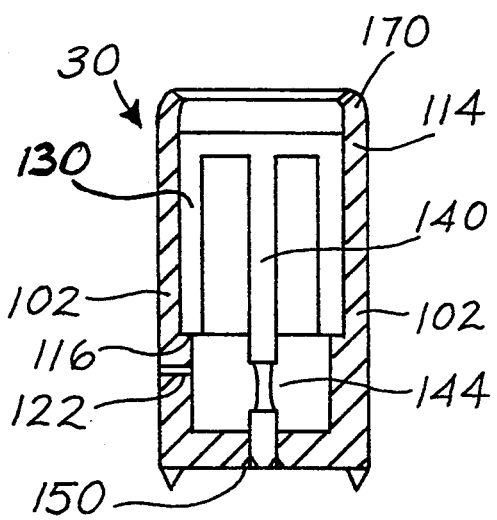
FIGS. 5–7 show alternate embodiments of the invention.
Figure 6:
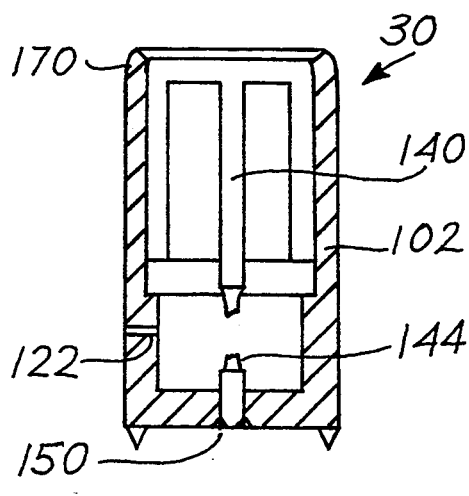
Figure 7:
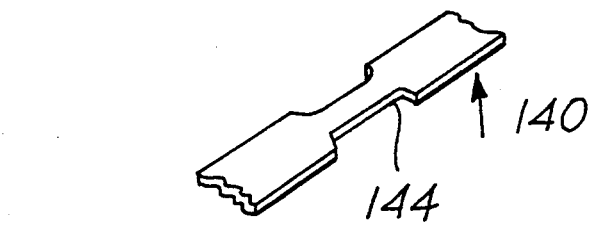

FIGS. 5 and 6 show an alternate embodiment of the device 30. The device 30 includes a housing having a shoulder or motion stop 116. The end 114 of the cylindrical wall 102 is bent over forming a lip to narrow the inner diameter of the housing 102. The piston 130 is again cup shaped and slidable within the housing 102. The frangible member 140 extends integrally from the piston 130 and is fastened to the housing as described above. After the pressure vessel is depressurized the frangible member 140 breaks at 144. FIG. 6 show the piston 130 separated after the frangible member broke the outward motion of the piston 130 is stopped by the lip 170. In this embodiment of the invention if after depressurization the inflator is shaken the piston 130 will slide in the housing 102 and provide an audible noise as the piston strikes the tip 170 and shoulder 116. Many changes and modifications in the above described embodiment of the invention can, of course, be carried out without departing from the scope thereof. Accordingly, that scope is intended to be limited only by the scope of the appended claims.

I claim:

1. A post depressurization device (30) for providing an indication of the pressure that existed within a fluid filled pressure vessel (22) just prior to depressurization of the pressure vessel, comprising:

a housing (102);

piston means (130) for temporality sealing an open end of the housing and outwardly movable in response to a pressure differential not less then a predetermined level generated subsequent to the depressurization of the pressure vessel;

the piston means and the housing cooperating to define a pressure storage cavity (156) bounded by the piston and housing, the housing including valve means (122) for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel.

2. The device as defined in claim 1 wherein the device is located within the pressure vessel.

3. The device as defined in claim 1 including frangible means for connecting the piston means to the housing and for breaking in response to a force applied to the piston means, such force corresponding to the predetermined level, the breaking of the frangible means permitting the piston means to be moved outwardly in response to the force corresponding to the pressure differential acting thereon.

4. The device as defined in claim 3 wherein the housing includes a narrowed portion to trap the piston means there after the frangible means had been broken.

5. The device as defined in claim 3 wherein the frangible means includes one of a bar and strip having a portion having a tensile strength of such a level to permit the frangible means to break when the piston means is subjected to the force.

6. The device as defined in claim 5 wherein the frangible means includes one of a flat bar and strip.

* * * * *